June 3, 1941.  F. W. KASTEN  2,244,538
PLOWING AND ROOT SEPARATING APPARATUS
Filed Jan. 17, 1940

INVENTOR
FRED W. KASTEN
BY
Wheeler, Wheeler & Wheeler
ATTORNEYS

Patented June 3, 1941

2,244,538

UNITED STATES PATENT OFFICE 2,244,538

PLOWING AND ROOT SEPARATING APPARATUS

Fred W. Kasten, Sturgeon Bay, Wis.

Application January 17, 1940, Serial No. 314,215

7 Claims. (Cl. 97—34)

My invention relates to improvements in plowing and root separating apparatus.

The primary object of my invention is to provide effective means for loosening or pulverizing the soil, and lifting and removing the roots therefrom during a plowing operation and while the furrow slice or slices are in an elevated and furrow turning position.

So-called quack grass and similar vegetation normally have their root systems close to the surface of the soil, and an ordinary plowing operation buries them in the bottom of the previously formed furrow and covers them with a mass of earth of such depth that the roots cannot be effectively reached and removed by succeeding harrowing operations. Their continued vegetation brings them to the surface in time to interfere with the growth of seeds which have been sown or planted, and therefore the efforts heretofore made to eliminate quack grass from cultivated soil have been largely ineffective.

It is my object to provide means, operative underneath a turning furrow slice, to lift and break up the earth masses while they are still elevated by the plow, and to lift and remove roots from earth and deposit them on the surface of the plowed ground instead of allowing them to be deposited at the bottom of the previously turned furrow.

More particularly stated, it is my object to mount a rotary pronged drum adjacent the face of the moldboard of a plow in a position to allow the plow to lift and deposit the turning furrow slice upon the top of the drum, or upon the forward half thereof, and to provide power driven means for rotating the drum in such a direction that its prongs will move upwardly through the earth so deposited.

My invention is peculiarly adapted to be used when plowing fallow ground, and it will ordinarily be used in association with a tractor or motor driven set of plows, it being desirable to provide adequate power for rotating the pronged drums for the purposes set forth.

In the drawing.

Like parts are identified by the same reference characters throughout the several views.

Figure 1:
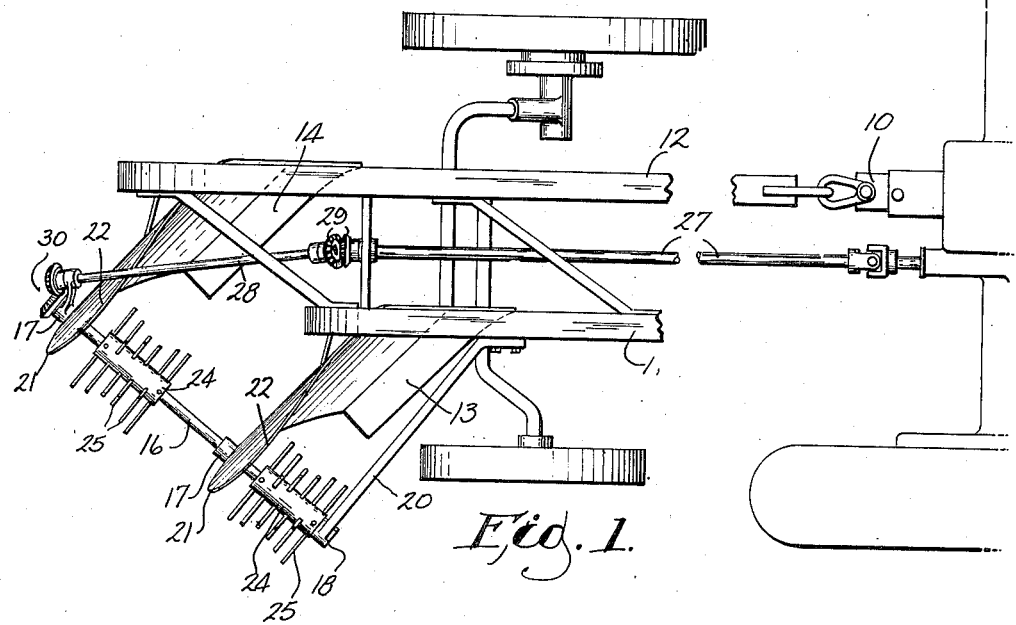
Figure 1 is a plan view of a set of plows to which my invention has been applied, the plows being connected with the drawbar of a motor driven tractor, a rear fraction of which is illustrated.
Figure 2:
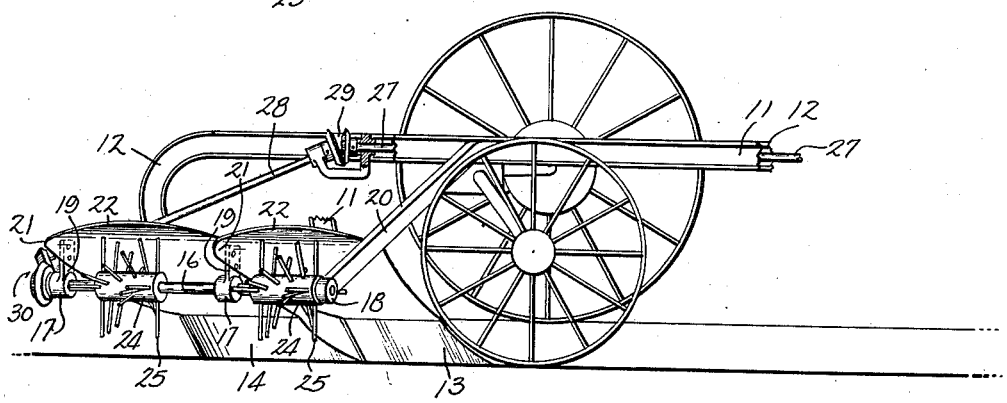
Figure 2 is a side view of the plows and associated parts, with the shorter plow beam broken away.

In Figure 1, I have illustrated the rear end of an ordinary motor driven tractor, having a drawbar 10 to which plow beams 11 and 12 are attached, the plow beam 12 being longer than the plow beam 11, whereby the plows 13 and 14 attached to the downwardly curving rear ends of these beams may operate successively in turning successive furrows. The plow beams and the plows may be assumed to be of any ordinary construction.

For the purposes of my invention, I mount a shaft 16 in suitable bearings 17 and 18. The bearings 17 are carried by brackets 19 from the rear sides of the respective mold boards, and the end bearing 18 may be supported from the plow beam by a brace 20. Due to the fact that the plow beam 12 is of greater length than the beam 11, the shaft 16 will extend obliquely across the tail portions 21 in the rear of the peaks 22 of the moldboards.

Pulverizing and root separating drums 24 are mounted upon the shaft 16, adjacent the face of each moldboard and are provided with radially projecting prongs 25. When the shaft is rotated in the direction indicated by the arrow in Figure 3 these prongs will move upwardly underneath the elevated and inverting furrow slices, and operate with a combing action through the soil. Their movement is sufficiently rapid and powerful to cause them to penetrate the soil, comb out the roots and toss them obliquely over the surfaces of the previously plowed earth. Due to the oblique pitch of the shaft and drums, each prong will revolve in a plane oblique to the line of travel.

The prongs 25 on each drum will preferably be staggered with reference to the preceding and succeeding prongs in the planes of rotation, and also, they will preferably be disposed in helical rows or staggered with reference to each other in each lineal series, whereby some of the prongs will constantly be entering the soil while other prongs of the same set are advancing through it. The arrangement may be such that only one or two prongs on each drum will be initially entering the soil at any given instant.

Figure 3:
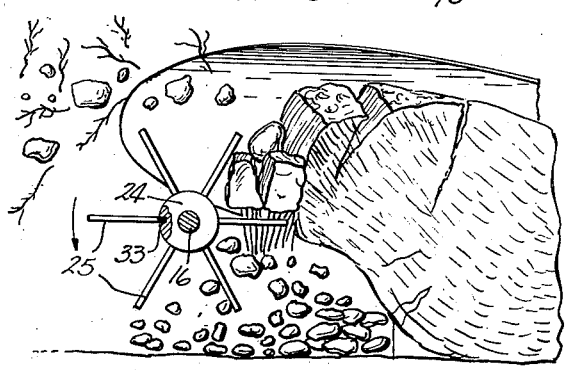
Figure 3 is a diagram illustrating the position of one of the root separating drums with reference to a furrow slice which has been lifted and partially turned by one of the plows.

As shown at 33 in Figure 3, the prongs are preferably made removable, each prong being threaded and seated in a threaded drum socket. Therefore, broken or worn prongs may be readily replaced.

Rotary motion is imparted to the drum carrying shaft 16 through a driving shaft 27, the beveled gear set 29, the downwardly inclined shaft extension 28, and the beveled gear set 30, the driven gear being mounted on the shaft 16. Power may be derived from any suitable source, such as the motor of a tractor, with which the plow beams are connected, or a bull wheel if the plows are to be drawn by horses. I prefer to employ a motor driven tractor, from the motor of which the transmission shaft 27 may be driven with adequate power and speed, the rate of rotation of the drums being such that the prongs will effectively toss the roots away from the falling earth and deposit them upon earth which has previously been plowed. The arrangement of the driving shafting and gearing is such as to rotate shaft 16 in the proper direction to cause the prongs to move upwardly on the front or the advancing side of each drum.

I claim:

1. The combination with a plow, of a rotatable pronged root lifting device supported adjacent the moldboard of the plow in a position to receive a turning furrow slice on its upwardly moving prongs, and means for rotating said device in a direction to cause its forwardly projecting prongs to move upwardly through the elevated furrow slice for removal of roots therefrom, said root lifting device having its axis extending obliquely in the previously formed furrow and forwardly along the moldboard of the plow, whereby its prongs may rotate in oblique planes normal to said axis and throw the roots laterally over the surfaces of previously plowed soil and away from the falling earth deposited upon the prongs by the plows.

2. The combination with a set of plows supported for successive operation, of an obliquely disposed rotatable shaft extending across the tail pieces of the respective moldboards, radially pronged root lifting drums mounted upon the shaft at the earth turning sides of the respective moldboards for operation underneath the turning furrow slices lifted by the plows, and power driven connections for actuating said shaft in a direction to cause the prongs of the respective drums to move through the turning furrow slice from the under side to lift and remove the roots and deliver them laterally upon the previously plowed ground.

3. The combination with a plowing apparatus the combination with a plow share including a moldboard, of power driven lifting fingers laterally offset from the working face of the mold board and projecting obliquely toward the path of the moldboard in the space underneath the furrow slice inverted thereby operative underneath turning furrow slices for the disintegration of earth masses and the removal of roots while the earth is dropping into the previously turned furrow.

4. In plowing apparatus, a power driven root separator having a supporting and operating shaft disposed obliquely to the line of plow travel underneath the tail piece of the moldboard and provided with root separating elements extending radially from the shaft axis and obliquely in the direction of the concave face of the moldboard, said elements being provided with means for actuating them in an upward direction underneath a turning furrow slice.

5. A plowing apparatus as set forth in claim 3, in which the lifting fingers are mounted upon a rotary drum and supported in staggered relation to each other for successive action upon a turning furrow slice.

6. In plowing apparatus, the combination with a plow share and associated moldboard, a set of revoluble power driven root pickers mounted in space laterally offset from the working face of the moldboard and means for moving said pickers upwardly and laterally through a turning furrow in cyclic paths oblique to the line of plow travel, whereby they are adapted to lift roots from an elevated and inverting furrow slice and throw them centrifugally over previously plowed ground; the space occupied by said pickers being unobstructed by other root engaging elements of the plow mechanism.

7. The combination with the share and moldboard of a plow, of a rotary root picker mounted to revolve upon a substantially horizontal axis oblique to the line of plow travel and laterally offset from the concave face of the moldboard in the rear of the share, said picker being provided with prongs projecting in a generally radial direction from its axis of rotation, and having power transmitting connections for rotating it in a direction to carry its forwardly projecting prongs upwardly in planes oblique to the path of the plow and underneath an inverting furrow slice, whereby to pick out grass roots and distribute them laterally over previously plowed ground.

FRED W. KASTEN.